United States Patent
Ficko et al.

(10) Patent No.: US 8,239,924 B2
(45) Date of Patent: Aug. 7, 2012

(54) METHOD AND SYSTEM FOR AUTHENTICATING A USER BASED ON A PHYSICAL OBJECT

(75) Inventors: Bradley W. Ficko, Manotick (CA); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 381 days.

(21) Appl. No.: 12/578,811

(22) Filed: Oct. 14, 2009

(65) Prior Publication Data

US 2011/0088083 A1 Apr. 14, 2011

(51) Int. Cl.
*G06F 21/00* (2006.01)

(52) U.S. Cl. .......................................................... 726/5
(58) Field of Classification Search ................. 726/5
See application file for complete search history.

(56) References Cited

U.S. PATENT DOCUMENTS

| | | | |
|---|---|---|---|
| 4,899,391 A | 2/1990 | Cimino et al. | |
| 5,517,299 A | 5/1996 | Teratani et al. | |
| 5,617,323 A | 4/1997 | Stansberry et al. | |
| 6,185,311 B1 | 2/2001 | Yanovsky et al. | |
| 2003/0084287 A1* | 5/2003 | Wang et al. | 713/168 |
| 2004/0162984 A1* | 8/2004 | Freeman et al. | 713/175 |
| 2005/0091490 A1* | 4/2005 | Ogura | 713/165 |
| 2007/0224008 A1* | 9/2007 | Bass et al. | 409/132 |
| 2008/0267514 A1* | 10/2008 | Alasia et al. | 382/232 |

* cited by examiner

*Primary Examiner* — Jason Gee

(74) *Attorney, Agent, or Firm* — Brian A. Lemm; Charles R. Malandra, Jr.; Steven J. Shapiro

(57) ABSTRACT

An authentication method based on the use of an inanimate physical object that includes storing first object data in a storage medium, wherein the first object data is generated based on a first image of at least a portion of the physical object, capturing a second image of the at least a portion of the physical object, and generating second object data based on the second image. The method further includes searching the storage medium and determining that the second object data and the first object data are a match, and authenticating an individual associated with the physical object in response that determination. Also provided are embodiments of an authentication system that may be adapted to implement the method.

20 Claims, 3 Drawing Sheets

METHOD AND SYSTEM FOR AUTHENTICATING A USER BASED ON A PHYSICAL OBJECT

FIELD OF THE INVENTION

The present invention relates to electronic authentication systems, and in particular, to a system and method wherein an individual may provide various forms of electronic authentication using a physical object.

BACKGROUND OF THE INVENTION

There are currently a large number of ways in which an individual may authenticate themselves when such authentication is required for a transaction, including traditional mechanical forms of authentication, and electronic/digital forms of authentication. As one example of a mechanical form of authentication, an individual will typically have a number of physical keys for, for example, locking and unlocking their car and/or their home. As one example of an electronic/digital form of authentication, an individual may have a credential (a digital key) in the form of a username and password or personal identification number for accessing their personal computer or a computer system such as a secure network, a secure web server or another type of secure server system, or for accessing their bank account using a bank card. As another example of an electronic/digital form of authentication, an individual may have a credential (a digital key) in the form of a public/private key pair for authenticating themselves to other computer systems, such as a secure network or secure web server or another type of secure server system. Electronic/digital forms of authentication such as the digital keys/credentials just described are generally hard for an individual to remember since they tend to be complex and since individuals tend to have a number of them.

Thus, there is a need for a system for simplifying and facilitating electrometric authentication.

SUMMARY OF THE INVENTION

In one embodiment, the invention provides an authentication method based on the use of an inanimate physical object, such as a physical key, that includes storing first object data in a storage medium, wherein the first object data is generated based on a first image of at least a portion of the physical key, capturing a second image of the at least a portion of the physical key, and generating second object data based on the second image. The method further includes searching the storage medium and determining that the second object data and the first object data are a match, and authenticating an individual associated with the physical key in response to that determination.

The storing step may further include storing one or more credentials (e.g., a username and password or a private key and associated public key certificate) in association with the first object data in the storage medium, and the authenticating step may include receiving the one or more credentials and authenticating the individual using one or more of the one or more credentials. In this embodiment, the storage medium may be a credential database located at a first location, wherein the capturing is performed using an imaging device located at a second location, and wherein the authenticating step includes transmitting the one or more credentials from the first location to the second location. Alternatively, the capturing step may be performed using an imaging device, wherein the storage medium is a secure credential storage medium of the imaging device. Alternatively, the authenticating step may include transmitting the one or more credentials to a third location, e.g., an internet banking server.

The first object data may be a first hash generated based on first digital data representing the first image, and the second object data may be a second hash generated based on second digital data representing the second image. Alternatively, the first object data may be the actual digital data that represents the first image, and the second object data may be the actual digital data that represents the second image generated during the capturing step.

The at least a portion of the physical object that is utilized may be an outline of a blade of a physical key. The at least a portion of the physical object may further include one or more surface markings, such as scratches, of the physical object. Also, the first image and the second image each preferably comprise an image of a first side of the object and a second side of the object.

In another embodiment, the invention provides an authentication system that includes a central computing device located at a first location, a database associated with the central computing device that stores first object data generated based on a first image of at least a portion of a physical object, such as, for example, a key, an imaging device located at a second location that captures a second image of the at least a portion of the physical object and generates second object data based on the second image, and a computing device, such as PC, located at the second location that is operatively coupled to the imaging device. The computing device receives the second object data from the imaging device and sends the second object data to the central computing device. The central computing device then searches the database and determines based on the searching that the second object data and the first object data are a match. Responsive to the central computing device determining that the second object data and the first object data are a match, the computing device is able to authenticate an individual associated with the physical object. The authentication system may be adapted to implement the method in the various embodiments just described.

In an alternative embodiment, the invention provides an authentication system that includes an imaging device having a secure storage storing first object data generated based on a first image of at least a portion of a physical object, such as a physical key. The imaging device captures a second image of the at least a portion of the physical object and generates second object data based on the second image. The authentication system also includes a computing device located at the second location and operatively coupled to the imaging device. The imaging device searches the secure storage and determines based on the searching that the second object data and the first object data are a match. Responsive to the imaging device determining that the second object data and the first object data are a match, the computing device is able to authenticate an individual associated with the physical object. The authentication system in this embodiment may be adapted to implement the method in the various embodiments described above.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
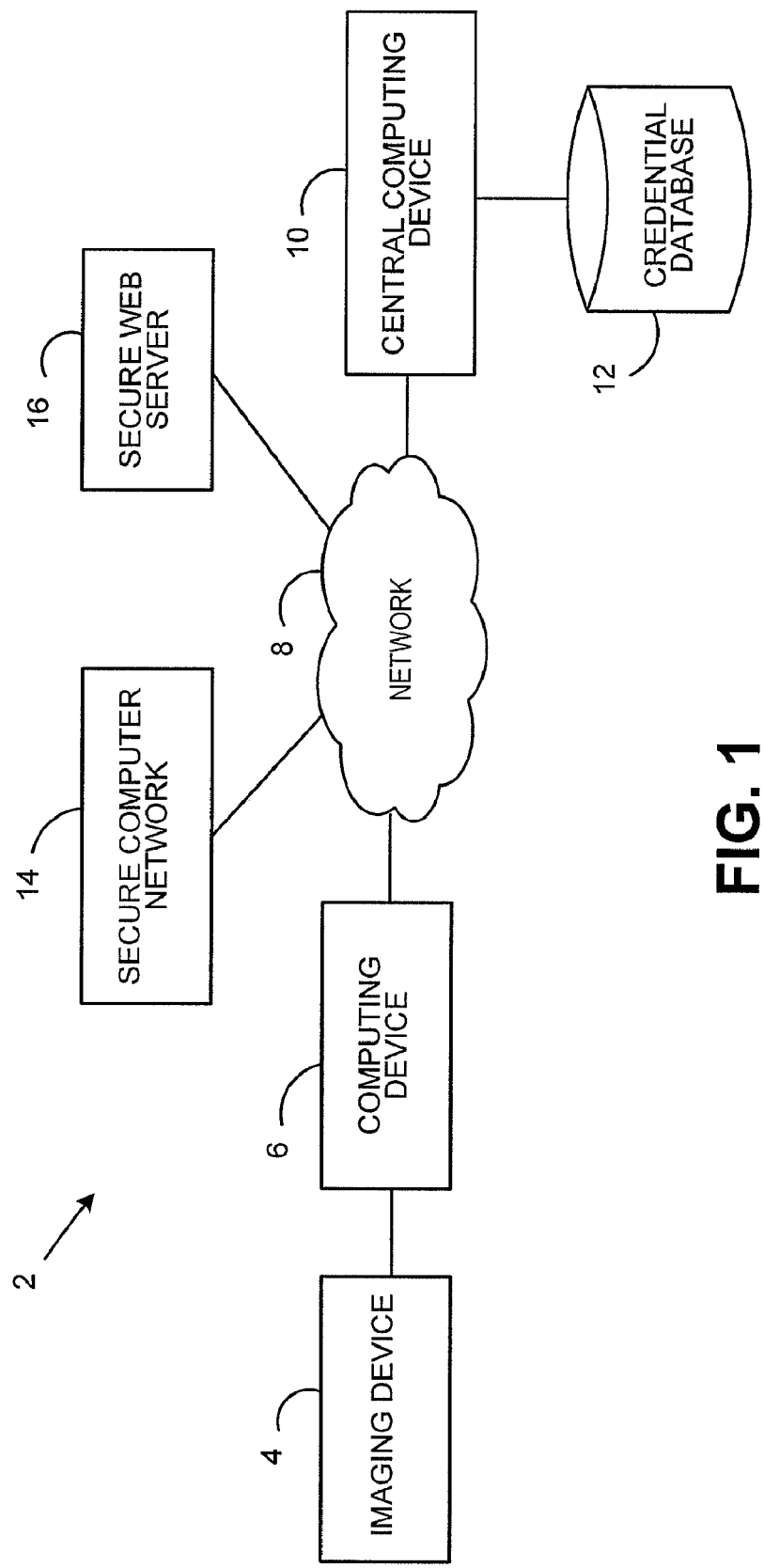
FIG. 1 is a block diagram of an electronic authentication system according to one embodiment of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

The present invention provides a number of embodiments of a system wherein an individual may electronically authenticate themselves to an information system, such as, without limitation, a personal computer, a secure network or a remote server, such as a secure web server or another type of secure server, using an inanimate physical object, such as a physical key. As described in greater detail below, the systems of the various embodiments of the present invention thus simplify and facilitate the process by which an individual may provide electrometric authentication by only requiring that they carry a physical object, such as, without limitation, a physical key that they might have for their car or home.

Figure 2:
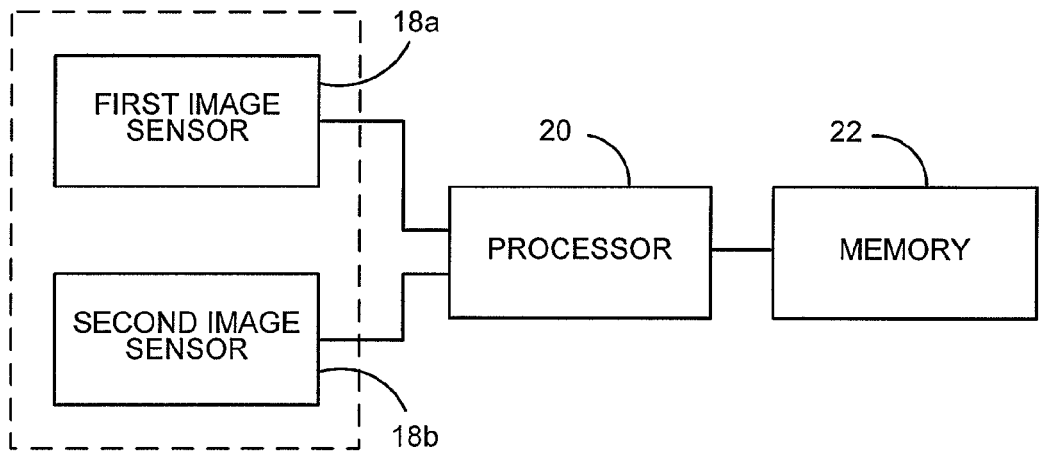
FIG. 2 is a block diagram of one particular, non-limiting embodiment of a imaging device that may be employed in the electronic authentication system of FIG. 1.

FIG. 1 is a block diagram of an electronic authentication system 2 according to one embodiment of the present invention. While the following description will be directed toward the use of a physical key as the physical object, it should be understood that any type of physical object could be utilized in place of a key. Such inanimate physical objects could include, for example, dog tags, medals worn on a necklace or bracelet, or other like personal items. The electronic authentication system 2 includes an imaging device 4 (a particular embodiment of which is shown in FIG. 2 and described elsewhere herein) that is structured to capture a digital image of an object. In the preferred embodiment, the image is an outline of the blade portion of a physical key which slides into the keyway of the associated lock. Also, the imaging device 4 is structured to generate a hash of the digital data of the captured image using a suitable hashing function. For convenience, the hash of the digital data of the captured image shall be referred to herein as "object data." The imaging device 4 is operatively coupled to a computing device 6, which in the preferred embodiment is a PC, but which may also be another type of electronic device such as, without limitation, a laptop or a personal digital assistant (PDA). The computing device 6 is operatively coupled to a network 8, which may be one or more wired and/or wireless communications networks alone or in various combinations, and may include, without limitation, the Internet, a local area network (LAN), a wide area network (WAN), or some combination thereof.

Although only one imaging device 4 and one associated computing device 6 are shown in FIG. 1, it is to be understood that this is for convenience only, and that multiple imaging devices 4 and associated computing devices 6 may form part of the electronic authentication system 2. As such, the electronic authentication system 2 may be implemented in a building or series of buildings of an organization, such as a corporation or other business, in order to enable the employees of the organization to provide electronic authentication for various purposes using any of the imaging devices 4 and associated computing devices 6 and a physical key in the manner described herein.

Furthermore, the electronic authentication system 2 includes a central computing device 10, which is preferably a central secure server. The central computing device 10 includes a number of computer executable routines (stored in an associated memory) for implementing the invention as described herein and for the processing of data in accordance with the invention as described herein. The routines can be in any of a variety of forms such as, without limitation, software, firmware, and the like. A secure credential database 12 is operatively coupled to the central computing device 10. The credential database 12 stores previously generated object data for a number of physical keys (i.e., any key which is to be used for electronic authentication using the electronic authentication system 2). In addition, in this embodiment, the credential database 12 also stores one or more electronic credentials in association with each item of object data which may be used for electronically authenticating the owner of the associated physical key. The credentials that are stored may include, for example and without limitation, a username and associated password, a private key and a public key certificate that includes the public key corresponding to the private key, or a secret cryptographic key. Finally, the electronic authentication system 2 further includes one or more secure computer networks 14 (for convenience, only one secure computer network 14 is shown) and one or more secure web servers 16, or some other type of secure server system (for convenience, only one web server 16 is shown). As described below, the credentials that are stored in the credential database 12 may be used for electronic authentication in order to gain access to one or more of the computing device 6, the secure computer network 14, and the secure web server 16.

FIG. 2 is a block diagram of one particular, non-limiting embodiment of the imaging device 4. The imaging device 4 in that embodiment includes a first image sensor 18a and a second image sensor 18b that are positioned such that a physical object can be inserted in between them. The first image sensor 18a and the second image sensor 18b are adapted to capture a digital image of the object, such as the outline of each side of a physical key (later used to create the object data described elsewhere herein). Each may be, for example, a charge coupled device (CCD) or a CMOS active-pixel sensor. One benefit of capturing an image comprising both sides of the key is that a proper image will be captured regardless of whether the key is inserted into the imaging device 4 upside down or right side up (the orientation of the image can be modified later as needed). Alternatively, instead of or in addition to capturing an optical image, the image sensors 18a, 18b could also capture images using sonar, electromagnetic resonance, or the like. The imaging device 4 also includes a processor 20 operatively coupled to a memory 22. The processor 20 may be, for instance, and without limitation, a microprocessor (µP), a microcontroller or some other suitable processing circuit or device, and interfaces with the memory 22. The memory 22 can be any of a variety of types of internal and/or external storage media such as, without limitation, RAM, ROM, EPROM(s), EEPROM(s) and combinations thereof, and the like that provide a storage register for data storage such as in the fashion of an internal storage area of a computer, and can be volatile memory or nonvolatile memory. The memory 22 additionally includes a number of routines executable by the processor 20 for implementing the invention as described herein and for the processing of data in accordance with the invention as described herein. The routines can be in any of a variety of forms such as, without limitation, software, firmware, and the like.

In operation, when an individual wants to authenticate himself or herself in order to, for example, gain access to the computing device 6, the secure computer network 14, and/or the secure web server 16, the individual accesses the appropriate credential or credentials by first inserting his or her physical key into the imaging device 4. The imaging device 4 then, upon sensing the presence of the physical key or in response to some input provided to the imaging device 4 (e.g., an input provided via an optional input apparatus such as a key pad provided as part of the imaging device 4), captures a digital image of the outline of the inserted key. If the preferred embodiment of the imaging device 4 as shown in FIG. 2 is being used, the captured digital image will be an image of the outline of each side of the key (in this case, the captured digital image will actually comprise two individual images). The captured digital image (the outline of the two sides in the preferred embodiment) is then provided to the processor 20. The processor 20 then generates object data by generating a hash of the digital data of the captured digital image using a suitable hashing function implemented in the routines stored in the memory 22. The generated object data is then provided to the computing device 6, which transmits the generated object data to the central computing device 10 through the network 8.

Upon receiving the generated object data from the computing device 6 as just described, the central computing device 10 searches the credential database 12 to determine whether the received object data matches any of the object data that is stored in the credential database 12. If no match is found, the central computing device 10 will transit an error message to the computing device 6 through the network 8, which is then displayed to the individual. If a match is found, then the credential or credentials associated with the matching stored object data is/are retrieved and securely transmitted (downloaded) from the central computing device 10 to the computing device 6 through the network 8. Alternatively, the credentials associated with the matching stored object data could be transmitted by the central computing device 10 to the secure computer network 14 or secure web server 16. The received credential or credentials may then be used for authenticating the individual as needed. For example, the received credentials could include a username and password that is used by the computing device 6 to authenticate the individual and grant him or her access to the computing device 6. Alternatively, the received credentials could include a username and password or a private key and associated public key certificate that is used to authenticate the individual to the secure computer network 14 or the secure web server 16 over the network 8. For example, a private key and associated public key certificate could be used in a challenge/response scheme to authenticate the individual to the secure computer network 14 or the secure web server 16 over the network 8.

In an alternative embodiment, rather than the object data being a hash of the captured digital image, the object data (generated by the imaging device 4 and stored in the credential database 12) could be the data of the captured digital image itself. As will be appreciated, the embodiment wherein the object data is a hash of the captured digital image provides greater security as it is preferable to store such hash data as opposed to the captured digital image data because if the credential database 12 were to be comprised, the captured digital image data could be used to create additional physical keys, which then may be used for theft, etc., whereas the hash data could not be so used, especially if a one-way hash function is employed. A system wherein the object data is the captured digital image data itself, while less secure, would nonetheless still be effective.

In another alternative embodiment, the captured digital image of the physical object may comprise more than or may be entirely different than an image of the outline (preferably of the blade of a key) of the physical object. For example, features such as scratches or other markings included on the surface of the object could be part of the captured digital image. This will help to distinguish between objects that are similar in shape, e.g., medals, dog tags, etc. and do not have different outlines as physical keys would.

In another alternative embodiment, the physical object itself acts as the credential that is used for authentication. More specifically, in this embodiment, the credential database 12 stores object data for a number of physical object (i.e., any object which is to be used for electronic authentication using the electronic authentication system 2), but not any electronic credentials in association with the object data as was the case with the embodiment described above. In operation, when an individual wants to authenticate himself or herself in order to, for example, gain access to the computing device 6, the individual inserts his or her physical object into the imaging device 4. The imaging device 4 then, upon sensing the presence of the physical object or in response to some input provided to the imaging device 4 (e.g., an input provided via an optional input apparatus such as a key pad provided as part of the imaging device 4), captures a digital image of the outline of the inserted object (or some other feature or features as described). As noted above, if the preferred embodiment of the imaging device 4 as shown in FIG. 2 is being used, the captured digital image will be an image of the outline of (or features on) each side of a key. The captured digital image is then provided to the processor 20. The processor 20 then generates object data by generating a hash of the digital data of the captured digital image using a suitable hashing function implemented in the routines stored in the memory 22. The generated object data is then provided to the computing device 6, which transmits the generated object data to the central computing device 10 through the network 8. Upon receiving the generated object data from the computing device 6, the central computing device 10 searches the credential database 12 to determine whether the received object data matches any of the object data that is stored in the credential database 12. If no match is found, the central computing device 10 will transit an error message to the computing device 6 through the network 8, which is then displayed to the individual. If a match is found, then the central computing device 10 will transit an authentication successful message to the computing device 6 through the network 8. In response to such a message, the computing device 6 grants access to the individual. In addition, the secure computer network 14 or the secure web server 16 may be adapted to grant access to the individual upon receipt of a similar authentication successful message from the central computing device 10 (or, alternatively, the computing device 6).

Figure 3:
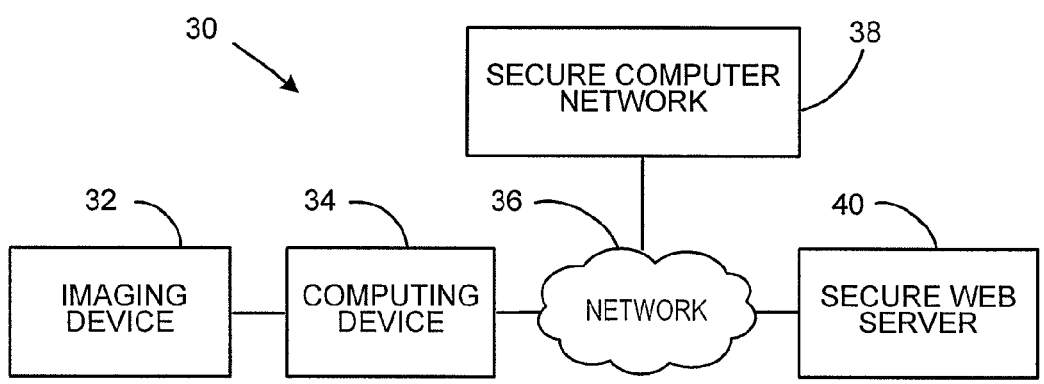
FIG. 3 is a block diagram of an electronic authentication system according to an alternative embodiment of the present invention.
Figure 4:
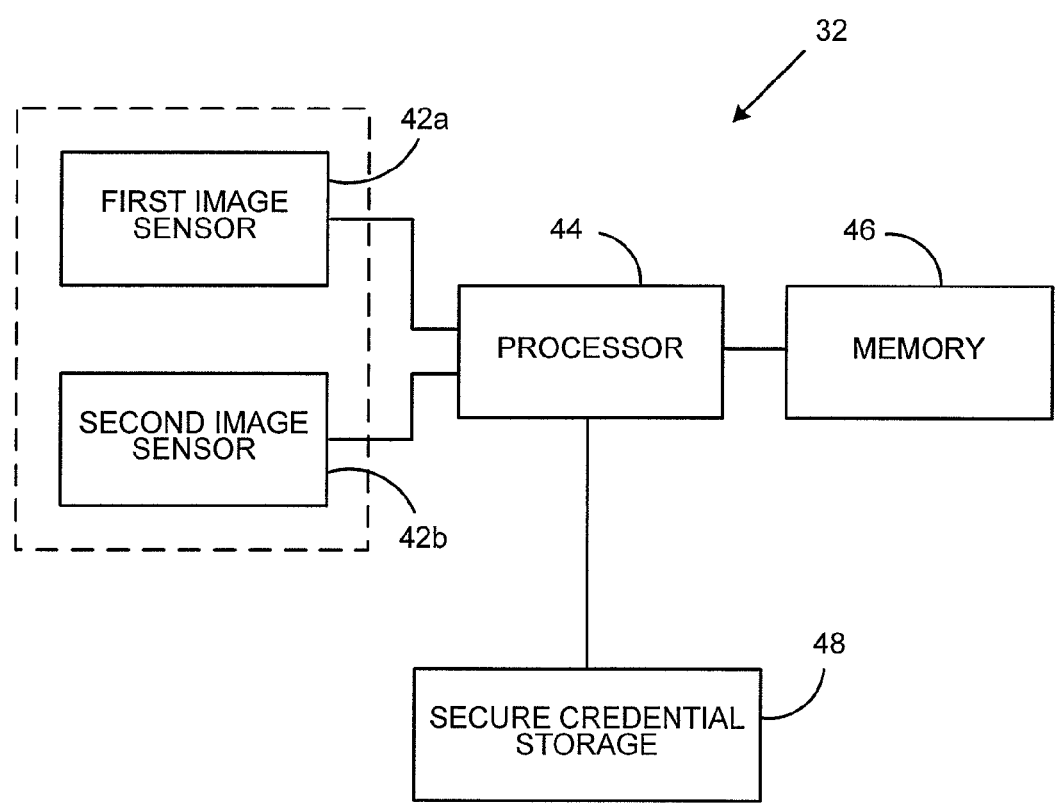
FIG. 4 is a block diagram of one particular, non-limiting embodiment of an imaging device that may be employed in the electronic authentication system of FIG. 3.

FIG. 3 is a block diagram of an electronic authentication system 30 according to a further alternative embodiment of the present invention. The electronic authentication system 30 includes an imaging device 32 (a particular embodiment of which is shown in FIG. 4 and described elsewhere herein) that is structured to capture a digital image of an outline of a physical object (in the preferred embodiment, the outline is an outline of the blade portion of a key, but may also include other features as described elsewhere herein) and to generate object data in the various forms described herein (preferably a hash of the captured digital image). In addition, the imaging device 32 is structured to store previously generated object data for a number of physical objects (i.e., any object which is to be used for electronic authentication using the electronic authentication system 30). In addition, the imaging device 32 also stores one or more electronic credentials (e.g., in the form described elsewhere herein) in association with each item of object data which may be used for electronically authenticating the owner of the associated physical object. The imaging device 32 is operatively coupled to a computing device 34, which in the preferred embodiment is a PC, but which may also be another type of electronic device such as, without limitation, a laptop or a personal digital assistant (PDA). The computing device 34 can be operatively coupled to a network 36, which may be one or more wired and/or wireless communications networks alone or in various combinations, and may include, without limitation, the Internet, a local area network (LAN), a wide area network (WAN), or some combination thereof. The electronic authentication system 30 can further include one or more secure computer networks 38 (for convenience, only one secure computer network 38 is shown) and one or more secure web servers 40, or some other type of secure server system (for convenience, only one web server 40 is shown). As described below, the credentials that are stored in the imaging device 32 may be used for electronic authentication in order to gain access to one or more of the computing device 34, the secure computer network 38, and the secure web server 40.

FIG. 4 is a block diagram of one particular, non-limiting embodiment of the imaging device 32. The imaging device 32 in that embodiment includes a first image sensor 42*a* and a second image sensor 42*b* that are positioned such that a physical object, e.g., a physical key or the like, can be inserted in between them. The first image sensor 42*a* and the second image sensor 42*b* are adapted to capture a digital image of the outline of each side of the physical object (or any other feature or features of the object that are later used to create the object data described elsewhere herein), and each may be, for example, a charge coupled device (CCD) or a CMOS active-pixel sensor. Alternatively, instead of or in addition to capturing an optical image, the image sensors 42*a*, 42*b* could also capture images using sonar, electromagnetic resonance, or the like. The imaging device 32 also includes a processor 44 operatively coupled to a memory 46. The processor 44 may be, for instance, and without limitation, a microprocessor (μP), a microcontroller or some other suitable processing circuit or device, and interfaces with the memory 46. The memory 46 can be any of a variety of types of internal and/or external storage media such as, without limitation, RAM, ROM, EPROM(s), EEPROM(s) and combinations thereof, and the like that provide a storage register for data storage such as in the fashion of an internal storage area of a computer, and can be volatile memory or nonvolatile memory. The memory 46 additionally includes a number of routines executable by the processor 44 for implementing the invention as described herein and for the processing of data in accordance with the invention as described herein. The routines can be in any of a variety of forms such as, without limitation, software, firmware, and the like. Finally, the imaging device 32 also includes secure credential storage 48 that stores, in a secure manner, the previously generated object data and associated electronic credentials as described elsewhere herein.

In operation, when an individual wants to authenticate himself or herself in order to, for example, gain access to the computing device 34, the secure computer network 38, and/or the secure web server 40, the individual accesses the appropriate credential or credentials by first inserting his or her physical object, e.g., physical key, into the imaging device 32. The imaging device 32 then, upon sensing the presence of the physical key or in response to some input provided to the imaging device 32 (e.g., an input provided via an optional input apparatus such as a key pad provided as part of the imaging device 32), captures a digital image of the outline of the inserted key (in the case of the preferred embodiment of the imaging device 32 shown in FIG. 4, the captured digital image will be an image of the outline of each side of the key) or other features as described above. The captured digital image is then provided to the processor 44. The processor 44 then generates object data by generating a hash of the digital data of the captured digital image using a suitable hashing function implemented in the routines stored in the memory 46. The processor 44 then searches the secure credential storage 48 to determine whether the generated object data matches any of the object data that is stored therein. If no match is found, the processor 44 will generate an error message which is sent to the computing device 34 and displayed to the individual. If a match is found, then the credential or credentials associated with the matching stored object data is/are retrieved and provided to the computing device 34. The received credential or credentials may then be used for authenticating the individual as needed. For example, the received credentials could include a username and password that is used by the computing device 34 to authenticate the individual and grant him or her access to the computing device 34. Alternatively, the received credentials could include a username and password or a private key and associated public key certificate that is used by the computing device 34 to authenticate the individual to the secure computer network 38 or the secure web server 40 over the network 36. For example, a private key and associated public key certificate could be used in a challenge/response scheme to authenticate the individual to the secure computer network 38 or the secure web server 40 over the network 36.

In an alternative embodiment, rather than the object data being a hash of the captured digital image, the object data (generated by the imaging device 32 and stored in the secure credential storage 48) could be the data of the captured digital image itself. In another alternative embodiment, the physical object itself acts as the credential that is used for authentication. More specifically, in this embodiment, the secure credential storage 48 stores object data for a number of physical objects (i.e., any object which is to be used for electronic authentication using the electronic authentication system 30), but not any electronic credentials in association with the object data as was the case with the embodiment described above. In operation, when an individual wants to authenticate himself or herself in order to, for example, gain access to the computing device 34, the individual inserts his or her physical object, e.g., physical key, into the imaging device 32. The imaging device 32 then, upon sensing the presence of the physical object or in response to some input provided to the imaging device 32, captures a digital image of the outline of the inserted object (or some other feature or features as described). The captured digital image is then provided to the processor 44. The processor 44 then generates object data by generating a hash of the digital data of the captured digital image using a suitable hashing function implemented in the routines stored in the memory 44. The generated object data is then used to search the secure credential storage 48 to determine whether the generated object data matches any of the object data that is stored in the secure credential storage 48. If no match is found, an error message is provided to the computing device 34 and displayed to the individual. If a match is found, then the processor 44 will transit an authentication successful message to the computing device 34. In response to such a message, the computing device 34 grants access to the individual. In addition, the secure computer network 38 or the secure web server 40 may be adapted to grant access to the individual upon receipt of a similar authentication successful message from the computing device 34.

In any embodiment where a feature, such as scratches, of the surface of the physical object is used to generate the object data described herein, the object data stored in either the credential database 12 or the secure credential storage 48 (depending on the particular embodiment) should, preferably be updated periodically as such features may change over time. Using such other features in the generation of the object data may be beneficial and desirable in certain applications as they may be used to distinguish an original physical key from a copy made of that key so that only the original key (with the features that are part of the stored object data) will be able to be used for successful authentication.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for authenticating an individual using a physical key associated with the individual, the method comprising:
    storing, in a storage medium, first object data generated based on a first image of at least a portion of the physical key, said at least a portion of said physical key including an outline of a blade of said physical key;
    capturing, using an imaging device, a second image of said at least a portion of said physical key;
    generating, using a processing device, second object data based on said second image;
    searching, using said processing device, said storage medium and determining based on said searching that said second object data and said first object data are a match; and
    authenticating an individual associated with said physical key based on said second object data and said first object data matching.

2. The method according to claim 1, wherein said storing further comprises storing one or more credentials in association with said first object data in said storage medium, and wherein said authenticating comprises receiving said one or more credentials and authenticating said individual using one or more of said one or more credentials.

3. The method according to claim 2, wherein said storage medium is a credential database located at a first location, wherein said capturing is performed using said imaging device located at a second location, and wherein said authenticating comprises transmitting said one or more credentials from said first location to said second location.

4. The method according to claim 2, wherein said storage medium is a secure credential storage of said imaging device.

5. The method according to claim 1, wherein said first object data is a first hash generated based on first digital data representing said first image, and wherein said second object data is a second hash generated based on second digital data representing said second image.

6. The method according to claim 1, wherein said first object data is first digital data representing said first image, and wherein said second object data is second digital data representing said second image generated during said capturing.

7. The method according to claim 1, wherein said first image and said second image each comprise an image of a first side of said blade and a second side of said blade.

8. An authentication system, comprising:
    a first computing device located at a first location;
    a database associated with said first computing device, said database storing first object data generated based on a first image of at least a portion of a physical key, said at least a portion of said physical key including an outline of a blade of said physical key;
    an imaging device located at a second location, said imaging device capturing a second image of said at least a portion of said physical key and generating second object data based on said second image; and
    a second computing device located at said second location and operatively coupled to said imaging device;
    wherein said second computing device receives said second object data from said imaging device and sends said second object data to said first computing device, wherein said first computing device searches said database and determines based on said searching that said second object data and said first object data are a match, and wherein responsive to said first computing device determining that said second object data and said first object data are a match said second computing device is able to authenticate an individual associated with said inanimate physical object.

9. The authentication system according to claim 8, wherein said database stores one or more credentials in association with said first object data, wherein responsive to said first computing device determining that said second object data and said first object data are a match said first computing device sends said one or more credentials to a computer system located at a third location.

10. The authentication system according to claim 8, wherein said database stores one or more credentials in association with said first object data, wherein responsive to said first computing device determining that said second object data and said first object data are a match said first computing device sends said one or more credentials to said second computing device, and wherein said second computing device is able to authenticate said individual using one or more of said one or more credentials.

11. The authentication system according to claim 10, wherein said second computing device authenticates said individual to a computer system located at a third location using the one or more of said one or more credentials.

12. The authentication system according to claim 10, wherein said second computing device authenticates said individual and grants said individual access to said second computing device using the one or more of said one or more credentials.

13. The authentication system according to claim 8, wherein responsive to said first computing device determining that said second object data and said first object data are a match said first computing device sends an authentication successful message to said second computing device, and wherein said second computing device is able to authenticate said individual based on said authentication successful message.

14. The authentication system according to claim 8, wherein said first object data is a first hash generated based on first digital data representing said first image, and wherein said second object data is a second hash generated based on second digital data representing said second image.

15. The authentication system according to claim 8, wherein said first object data is first digital data representing said first image, and wherein said second object data is second digital data representing said second image generated when said imaging device captures said first image.

16. The authentication system according to claim 8, wherein said first image and said second image each comprise an image of a first side of said blade and a second side of said blade.

17. An authentication system, comprising:
an imaging device, said imaging device having a secure storage storing first object data generated based on a first image of at least a portion of a physical key, said at least a portion of said physical key including an outline of a blade of said physical key, said imaging device capturing a second image of said at least a portion of said physical key and generating second object data based on said second image; and
a computing device located at said second location and operatively coupled to said imaging device;
wherein said imaging device searches said secure storage and determines based on said searching that said second object data and said first object data are a match, and wherein responsive to said imaging device determining that said second object data and said first object data are a match said computing device is able to authenticate an individual associated with said physical key.

18. The authentication system according to claim 17, wherein said secure storage stores one or more credentials in association with said first object data, wherein responsive to said imaging device determining that said second object data and said first object data are a match said imaging device sends said one or more credentials to said computing device, and wherein said computing device is able to authenticate said individual using one or more of said one or more credentials.

19. The authentication system according to claim 17, wherein responsive to said imaging device determining that said second object data and said first object data are a match said imaging device sends an authentication successful message to said computing device, and wherein said computing device is able to authenticate said individual based on said authentication successful message.

20. The authentication system according to claim 17, wherein said first object data is a first hash generated based on first digital data representing said first image, and wherein said second object data is a second hash generated based on second digital data representing said second image.

* * * * *